United States Patent
Kim et al.

(10) Patent No.: US 7,199,968 B2
(45) Date of Patent: Apr. 3, 2007

(54) LOCKING DEVICE FOR TAPE CASSETTE HOUSING OF TAPE RECORDER

(75) Inventors: Bong-joo Kim, Suwon (KR); Hyeong-seok Choi, Suwon (KR); Jae-kab Seo, Suwon (KR)

(73) Assignee: Samsung Electronics Co., Ltd., Suwon, Gyunggi-do (KR)

( * ) Notice: Subject to any disclaimer, the term of this patent is extended or adjusted under 35 U.S.C. 154(b) by 417 days.

(21) Appl. No.: 10/670,345

(22) Filed: Sep. 26, 2003

(65) Prior Publication Data

US 2004/0109260 A1 Jun. 10, 2004

(30) Foreign Application Priority Data

Oct. 8, 2002 (KR) .................... 10-2002-0061325

(51) Int. Cl.
*G11B 15/675* (2006.01)
*G11B 5/008* (2006.01)

(52) U.S. Cl. .................................... 360/96.5
(58) Field of Classification Search ........... 360/96.5
See application file for complete search history.

(56) References Cited

U.S. PATENT DOCUMENTS 4,422,114 A * 12/1983 Sugihara ............... 360/96.4
5,754,360 A * 5/1998 Lee et al. ............... 360/85

FOREIGN PATENT DOCUMENTS

| CN | 1155734 | 7/1997 |
| JP | 59-42557 U | 9/1982 |
| JP | 08-335347 A | 12/1996 |

\* cited by examiner

*Primary Examiner*—Julie Anne Watko
(74) *Attorney, Agent, or Firm*—Roylance, Abrams, Berdo & Goodman, L.L.P.

(57) ABSTRACT

A locking device for a tape cassette housing of a tape recorder comprises a locking recess and a locking protrusion respectively provided in sides of a tape cassette housing and a deck chassis and corresponding to each other, thereby fastening a tape cassette housing to the deck chassis, the tape cassette housing resiliently coming into contact with the deck chassis as a tape cassette is loaded. In here, around external circumference of the locking protrusion is formed at least one edge, and an end of the edge comes into contact with a corner of the locking recess right before the locking protrusion is inserted into the locking recess. Accordingly, the locking protrusion comes into linear contact with the corner of the locking recess in loading/unloading operations of the tape cassette so that the stopping of the ascending and descending movements of the tape cassette housing is prevented during the loading/unloading operations of the tape cassette.

16 Claims, 7 Drawing Sheets

LOCKING DEVICE FOR TAPE CASSETTE HOUSING OF TAPE RECORDER

PRIORITY

This application claims benefit under 35 U.S.C. § 119 to an application entitled "Locking Device for Tape Cassette Housing of Tape Recorder" filed in the Korean Intellectual Property Office on Oct. 8, 2002, and assigned Serial No. 2002-61325, the entire contents of which are incorporated herein by reference.

BACKGROUND OF THE INVENTION

1. Field of the Invention

The present invention relates to a tape recorder, and more particularly, to a locking device for locking a tape cassette housing, which comes into resilient and close contact with a deck chassis as a tape cassette is loaded into the deck chassis.

2. Description of the Prior Art

Generally, a tape recorder having a deck mechanism is an apparatus that records/reproduces audio and/or video information on/from a magnetic tape. Regarding this type of the tape recorder, common examples include a video tape recorder (VTR), a digital audio tape recorder (DAT), and a camcorder.

FIG. 1 shows a moving deck 100 of a camcorder. The camcorder is taken as one example of the tape recorder. As shown in FIG. 1, the moving deck 100 includes a deck chassis 110, a tape cassette housing 120, and a locking device 190 for locking the tape cassette housing 120 onto the deck chassis 110. In the case of the moving deck 100 which is usually employed for the camcorder, the deck chassis 110 includes a main-chassis 111 and a sub-chassis 112 that reciprocally slides on the main-chassis 111 as a magnetic tape is loaded/unloaded.

The tape cassette housing 120 is for loading a tape cassette removably. First and second link members 160 and 170 hinged to both sides of the tape cassette housing 120 are slidably connected to the sub chassis 112, thereby allowing the tape cassette housing 120 to ascend and descend from and to the sub-chassis 112.

The locking device 190 includes a locking protrusion 195, a locking recess 197 corresponding to the locking protrusion 195, and a locking lever 191 hinged to a side of the tape cassette housing 120. The locking lever 191 is connected to the first link member 160 by a resilient member 180. The locking protrusion 195 is generally shaped as a cylinder protruding from a side of the locking lever 191. This locking protrusion 195 is formed by drawing the side of the locking lever 191 or by providing a separate rotatable roller member (not shown) on the side surface of the locking lever 191. The locking recess 197 is integrally formed with the sub-chassis 112 by cutting a part of a side of the sub chassis 112.

Hereinafter, the descriptions will be made about loading and unloading operations of the tape cassette of the tape recorder as constructed above.

A loading operation of the tape cassette is performed as follows: the tape cassette housing 120 housing the tape cassette therein is pressed toward the sub-chassis 112 and thus the locking protrusion 195 of the locking lever 191 is inserted into the locking recess 197 as shown in FIG. 2. An unloading operation of the tape cassette is performed as follows: an unlocking lever 117, pivotably disposed at the sub-chassis 112, presses an unlocking protrusion 193 formed at an end of the locking lever 191 in a direction so that the locking protrusion 195 is leased from the locking recess 197. Simultaneously, the first and the second link members 160 and 170 pivot due to a recovery force of the resilient member 180, and accordingly, the tape cassette housing 120 ascends in a direction in which the tape cassette housing 120 is separated from the sub-chassis.

However, it is often the case with conventional tape recorders that the ascending/descending movement of the tape cassette housing is stopped with the locking protrusion 195 being blocked by an edge 197a of the locking recess 197 as the tape cassette is loaded/unloaded, as shown in FIG. 3. This stoppage occurs since the locking protrusion 195 and the edge 197a of the locking recess 197 come into contact with each other at a contact point where stress forces of the locking protrusion 195 and the edge 197a are exerted over each other in equilibrium. Stoppage occurs more frequently as the contact time of the locking protrusion 195 and the edge 197a increases. Accordingly, there has been a demand for reducing the contact time between the locking protrusion 195 and the edge 197a on the loading/unloading operations of the tape cassette.

SUMMARY OF THE INVENTION

The present invention has been developed in order to solve the above problems in the prior art. Accordingly, an aspect of the present invention is to provide a locking device for a tape cassette housing of a tape recorder having an improved structure capable of preventing stopping of ascending and descending movements of the tape cassette housing during loading/unloading operation of the tape cassette.

A further aspect of the present invention is to provide a moving deck of a tape recorder which comprises a deck chassis, the deck chassis comprising a main chassis and a sub-chassis. The moving deck further comprises a tape cassette housing and a locking device for the tape cassette housing of the tape recorder, wherein the locking device comprises a locking lever, the locking lever comprising a guide surface, and is adapted to pivot within a range determined by a regulating protrusion and a second hinge, and hinged to a side of the tape cassette housing by a first hinge, and connected to a first link member by a resilient member, the resilient member adapted to allow the tape cassette housing to resiliently ascend and descend to and from a sub-chassis. Further, the locking device comprises a locking recess formed within the locking lever and a locking protrusion, integrally formed on a sub-chassis, adapted to be inserted into the locking recess so as to lock the tape cassette housing onto a sub-chassis in a close contacting manner.

BRIEF DESCRIPTION OF THE DRAWINGS

The above aspects and features of the present invention become more apparent by describing certain embodiments of the present invention with reference to the accompanying drawings, in which.

DESCRIPTION OF THE PREFERRED EMBODIMENT

Figure 1:
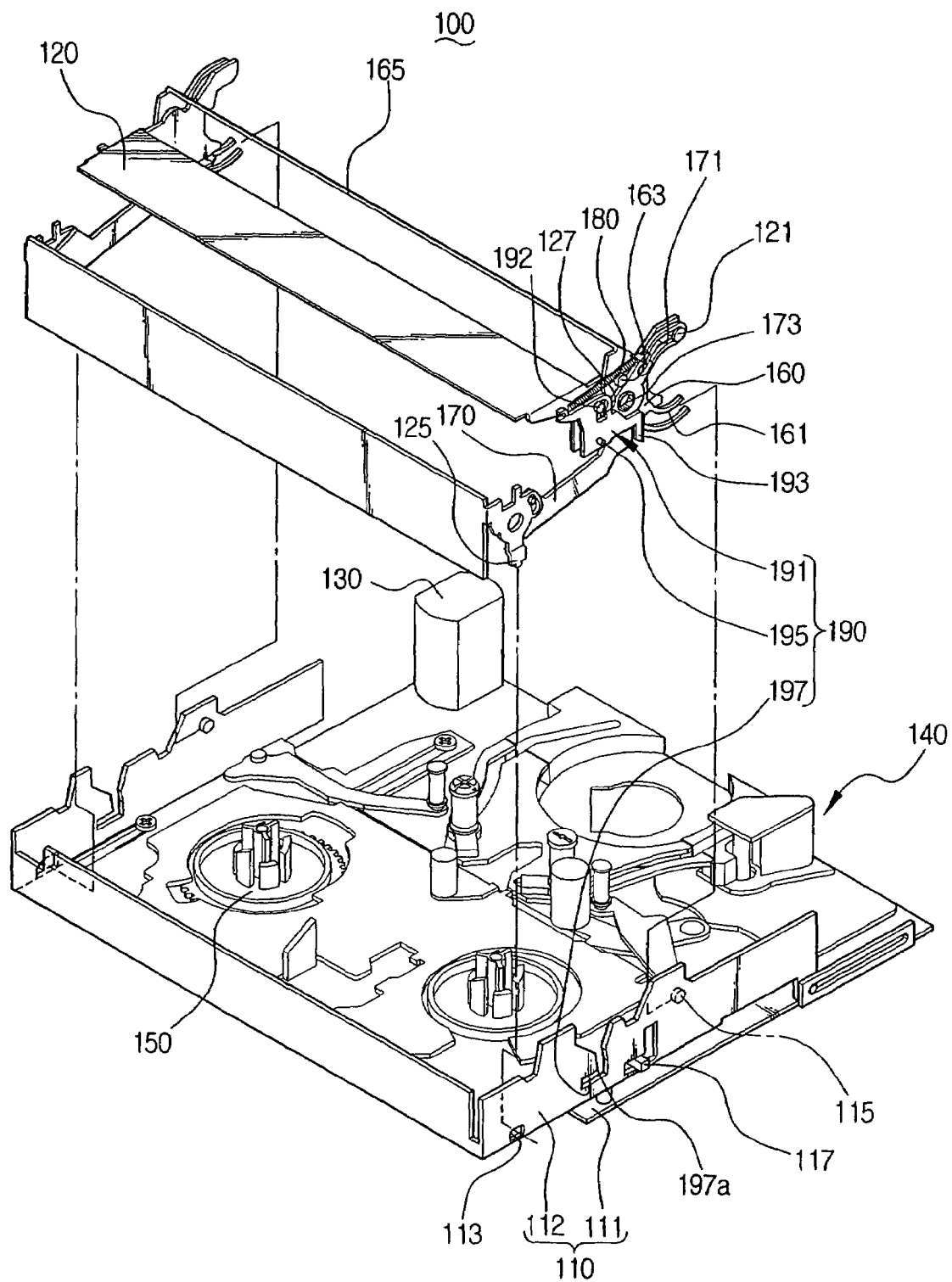
FIG. 1 is an exploded perspective view schematically showing a moving deck of a conventional camcorder.
Figure 2:
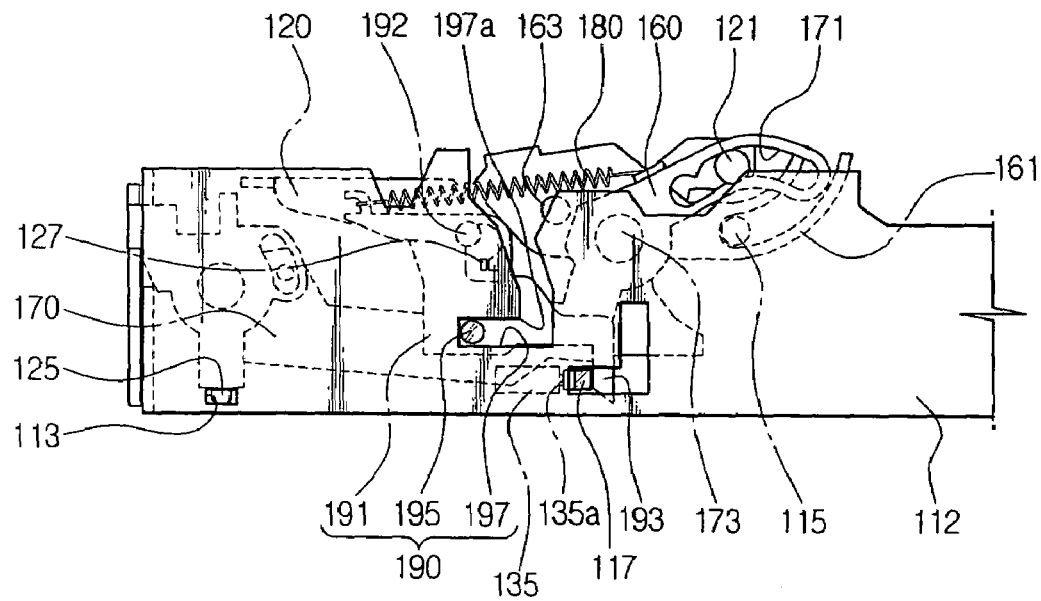
FIG. 2 is a side section view showing the tape cassette housing of FIG. 1 being locked onto the deck chassis.
Figure 3:
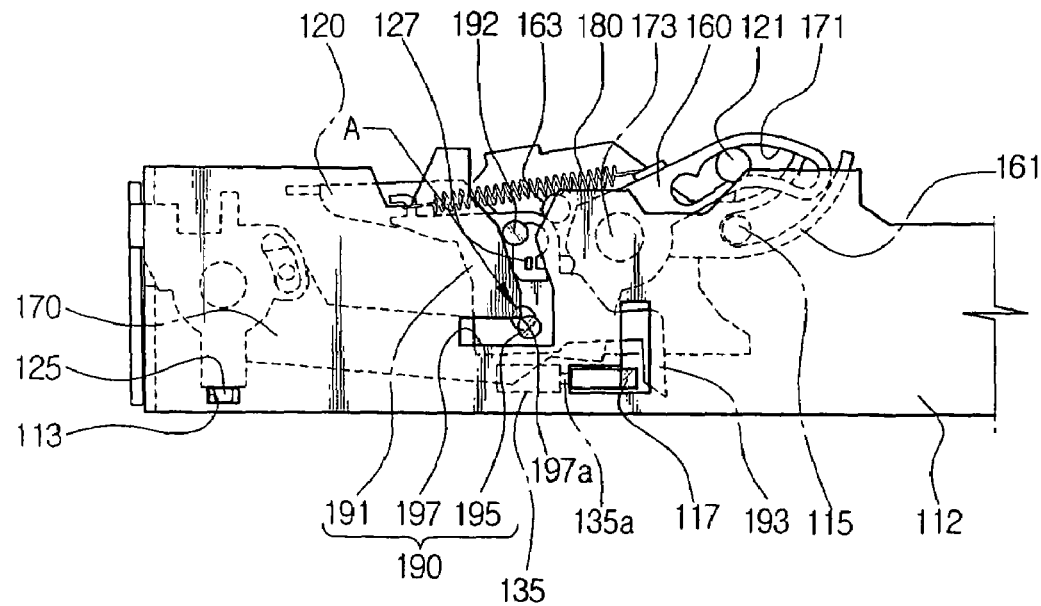
FIG. 3 is a side section view showing the tape cassette housing of FIG. 1 seated on the deck chassis.
Figure 4:
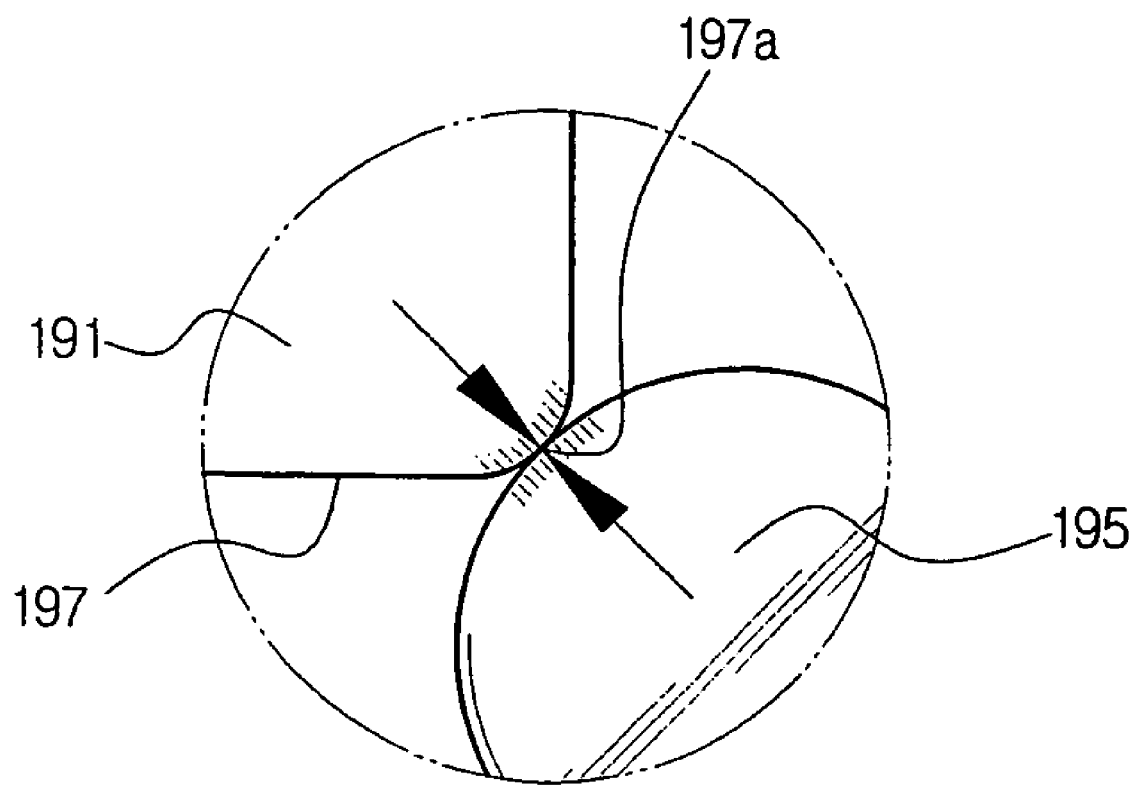
FIG. 4 is a side section view magnifying part of A of FIG. 3.

Hereinbelow, various embodiments of the present invention will be described in greater detail with reference to the accompanying drawings. Meanwhile, with respect to elements identical to those of the conventional tape recorder shown in and described through FIGS. 1 through 4, like reference numerals are assigned, and the detail descriptions thereof will be omitted.

Figure 5:
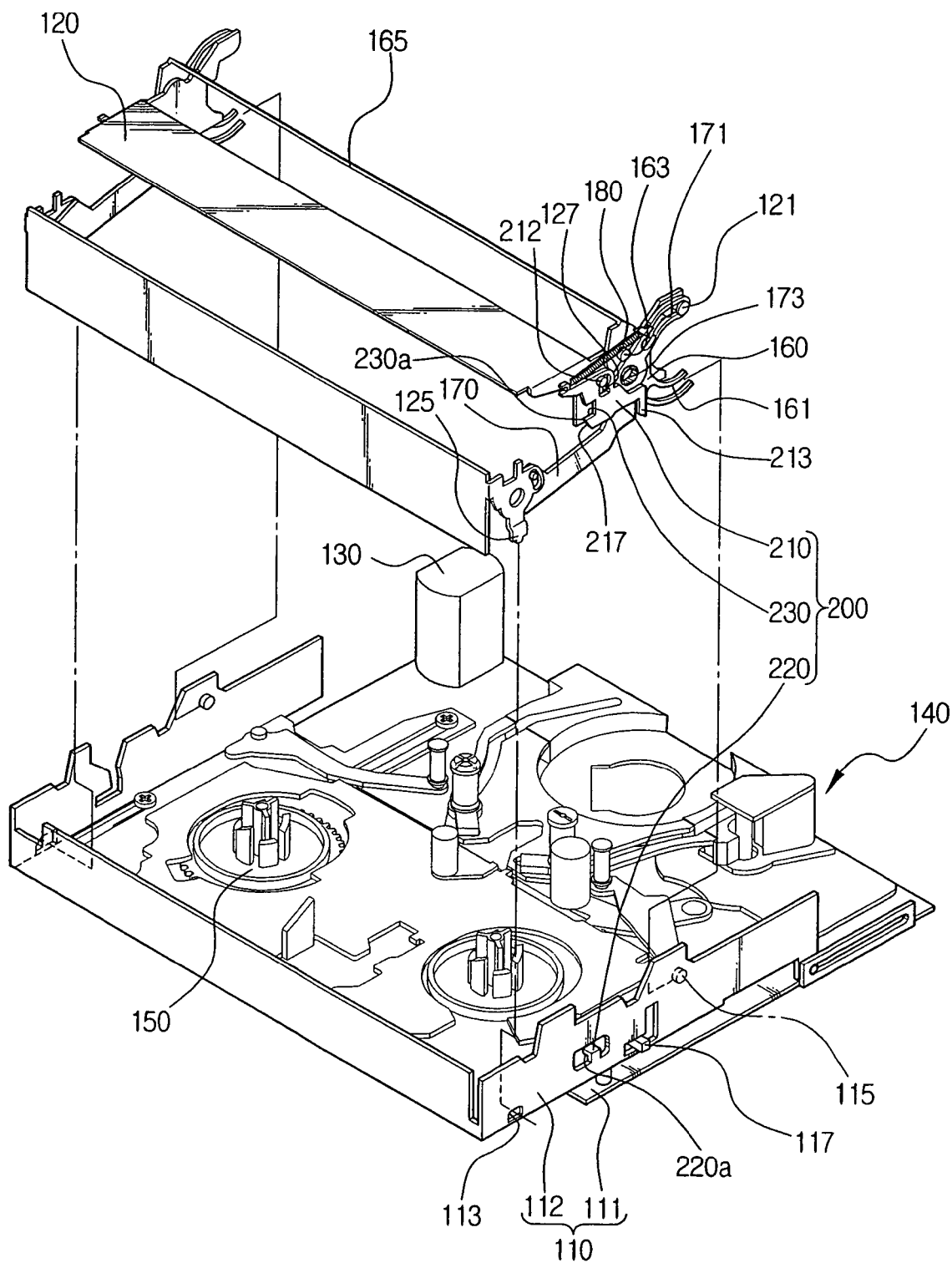
FIG. 5 is an exploded perspective view schematically showing a moving deck according to a first embodiment of the present invention.

Referring to FIG. 5, a moving deck 100 of a tape recorder according to an embodiment of the present invention is shown and includes a deck chassis 110, a tape cassette housing 120, and a locking device 200 for the tape cassette housing.

The deck chassis 110 includes a main-chassis 111 and a sub-chassis 112. On the main-chassis 111 are provided a loading motor 130 and a capstan-driving unit 140, and on the sub-chassis 112 is provided a pair of reel tables 150.

The tape cassette housing 120 removably houses a tape cassette (not shown). First and second link members 160 and 170, pivotably disposed at both sides of the tape cassette housing 120, are slidably mounted on the sub-chassis 112, so that the tape cassette housing 120 can ascend from, and descend to, the sub-chassis 112. Each of the first link members 160 is hinged to the tape cassette housing 120 using a first hinge 163. Respective upper ends of the first link members 160 are connected to each other via a connecting member 165. Each of the first link members 160 is provided with a first guide rail 161, disposed at a lower end thereof. The first guide rail 161 is slidably connected to a first guide protrusion 115 of the sub-chassis 112. The second link members 170 are hinged to the first link members 160 using second hinges 173. Each of the second link members 170 has a mounting protrusion 125 formed at a lower end thereof to be inserted into a mounting opening 113 of the sub-chassis 112. Upper ends of the second link members 170 are provided with second guide rails 171 into which second guide protrusions 121 protruding from both sides of the tape cassette housing 120 are inserted. In one embodiment, it is preferred that the second hinges 173 protrude from the second link member 170 to a predetermined height, though other configurations can be implemented, and the description thereof will be made below.

The locking device 200 includes a locking protrusion 220, a locking lever 210, and a locking recess 230. The locking protrusion 220 is integrally formed with the sub-chassis 112 and has at least one edge 220a. The formation of the edge 220a is achieved by forming the locking protrusion 220 with a non-circular traverse section. In this embodiment, the locking protrusion 220 is formed by cutting and bending at or about 90° a part of the sub-chassis 112 toward the inside of the sub chassis 112. Accordingly, the edges 220a are formed at both sides of the locking protrusion 220. As described above, when forming the locking protrusion 220 integrally with the sub-chassis 112, the relatively complicated drawing process for the conventional locking lever 191 (described in reference to FIG. 1), or installation of a separate roller member (not shown) is not required. In one embodiment of the invention, the locking protrusion 220 is formed in a shape so that a corner 230A of the locking recess 230 comes into contact with the edge 220a right before the locking protrusion 220 is inserted to the locking recess 230 in the loading operation of the tape cassette. Other shapes of locking protrusion 220 can be used in accordance with other embodiments of the invention.

The locking lever 210 is hinged to a side of the tape cassette housing 120 using a third hinge 212. The upper end of the locking lever 210 is connected to one of the first link members 160 by a resilient member 180. Due to the resilient member 180, the tape cassette housing 120 is capable of resiliently ascending and descending for the close contacting with, and separation from, the sub-chassis 112. One side of the locking lever 210 is provided with the locking recess 230 into which the locking protrusion 220 is inserted so as to lock the tape cassette housing 120 onto the sub-chassis 112 in a close contacting manner. The corner 230a of the locking recess 230 is connected to a guide surface 217 extending from the lower end of the locking lever 210. The locking lever 210 pivots within a range that is determined by a regulating protrusion 127, protruding from a side of the tape cassette housing 120, and a second hinge 173, protruding from the second link member 170 to a predetermined height. Accordingly, excessive pivoting movement of the locking lever 210 due to the recovery force of the resilient lever 210 can be prevented. Meanwhile, an unlocking protrusion 213 protrudes from a lower end of the locking lever 210. The unlocking protrusion 213 comes into contact with an end of the unlocking lever 117, pivotably disposed on the sub-chassis 112, when the tape cassette housing 120 is locked. Operation of the unlocking protrusion 213 will be described below.

Hereinafter, loading/unloading operations of the tape cassette housing as constructed above according to various embodiments of the present invention will be described with reference to the accompanying drawings.

A loading operation of the tape cassette is performed by pressing an upper surface of the tape cassette housing 120 toward the deck chassis 110. Accordingly, the second link members 170 pivot along the second guide protrusions 121 in a direction in which the lower end of the first link members 160 ascends. Since the first guide protrusions 115 of the sub-chassis 112 are slidably connected to the first guide rails 161 of the lower ends of the first link member 160, the interactive movement of the first and the second link members 160 and 170 allows the tape cassette housing 120 to closely contact the sub-chassis 112.

Figure 6:
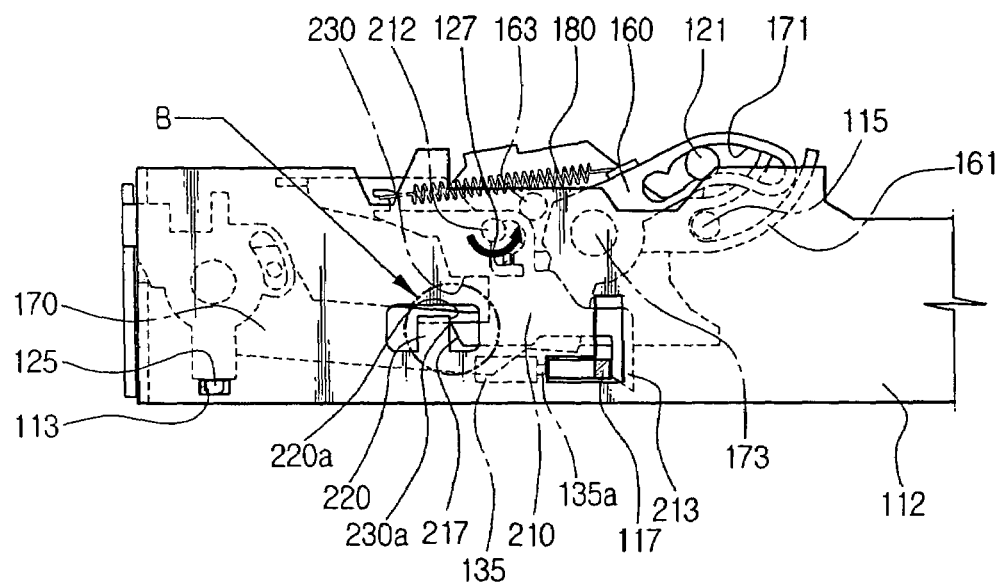
FIG. 6 is a side section view showing the tape cassette housing of FIG. 5 seated on the deck chassis.
Figure 7:
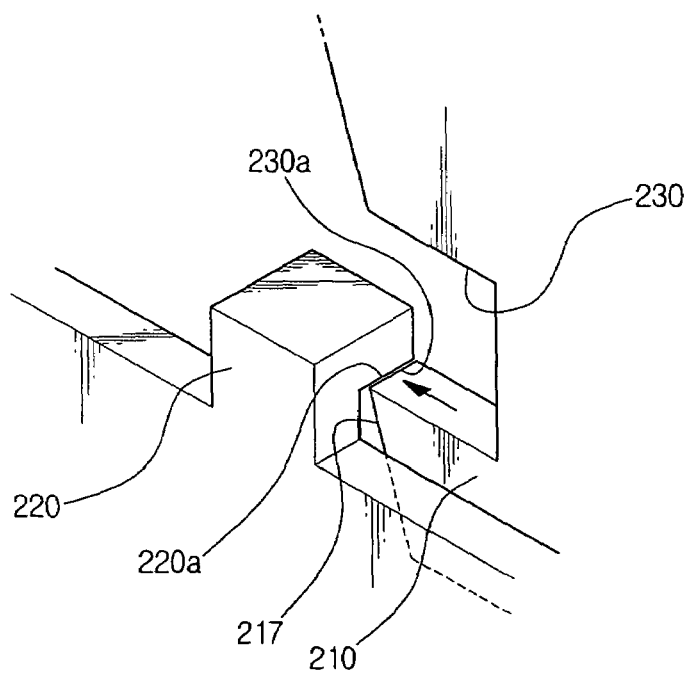
FIG. 7 is a perspective view magnifying part of B of FIG. 6.

When the tape cassette housing 120 descends in close contact with the sub-chassis 112 as described above, the guide surface 217 of the locking lever 210 comes into contact with the edge 220a formed at a side of the locking protrusion 220 and having an angled end as shown in FIG. 6. In this state, the descending movement of the tape cassette housing 120 continues so that the edge 220a of the locking protrusion 220 is guided toward the locking recess 230 and comes into contact with the corner 230a of the locking recess 230 (i.e. a boundary between the guide surface 217 and the locking recess 230). Since the guide surface 217 is inclined, the locking lever 210 pivots on the third hinge 212 in a direction of the arrow of FIG. 6, so that there occurs a recovery force in the resilient member 180. Accordingly, when the tape cassette housing 120 completely contacts the sub-chassis 112, the locking lever 210 pivots in an opposite direction to the arrow direction of FIG. 6, due to the recovery force of the resilient member 180 so that the locking protrusion 220 is inserted into the locking recess 230. At this point, the edge 220a and the corner 230a come into linear contact with each other as shown in FIG. 7. The linear contact reduces both contacting space and time. Accordingly, a "dead" point at which the conventional tape cassette housing 120 stops its movement can be prevented.

Meanwhile, when the user selects the ejection of the tape cassette, an unlocking switch 135 is operated so that a rod 135a disposed in a side of the unlocking switch 135 protrudes by more than a predetermined distance. Due to the operation of the unlocking switch 135, the unlocking lever 117 pivotably disposed at the sub-chassis 112 pivots to press the unlocking protrusion 213 protruding from the end of the locking lever 210 in a direction in which the locking protrusion 220 is released from the locking recess 230. The unlocking protrusion 213 is pressed by the unlocking lever 117 to thus pivot the locking lever 210 in the direction of the arrow of FIG. 6 and accordingly, the locking protrusion 220 is released from the locking process 230. After that, due to the recovery force of the resilient member 180, the tape cassette housing 120 automatically ascends. Simultaneously, the locking lever 210 pivots until its pivotal movement is limited by the regulating protrusion 127, so that the unloading operation of the tape cassette is completed.

The locking device 200 of the tape cassette housing 120 as constructed and operated above is limited to the embodiment described above. If the edge 220a of the locking protrusion 220 contacts with the corner 230a of the locking recess 230 in the loading/unloading operations of the tape cassette, the locking recess 230, the locking protrusion 220, and the locking lever 210 can be varied in their installation positions and shapes.

Figure 8:
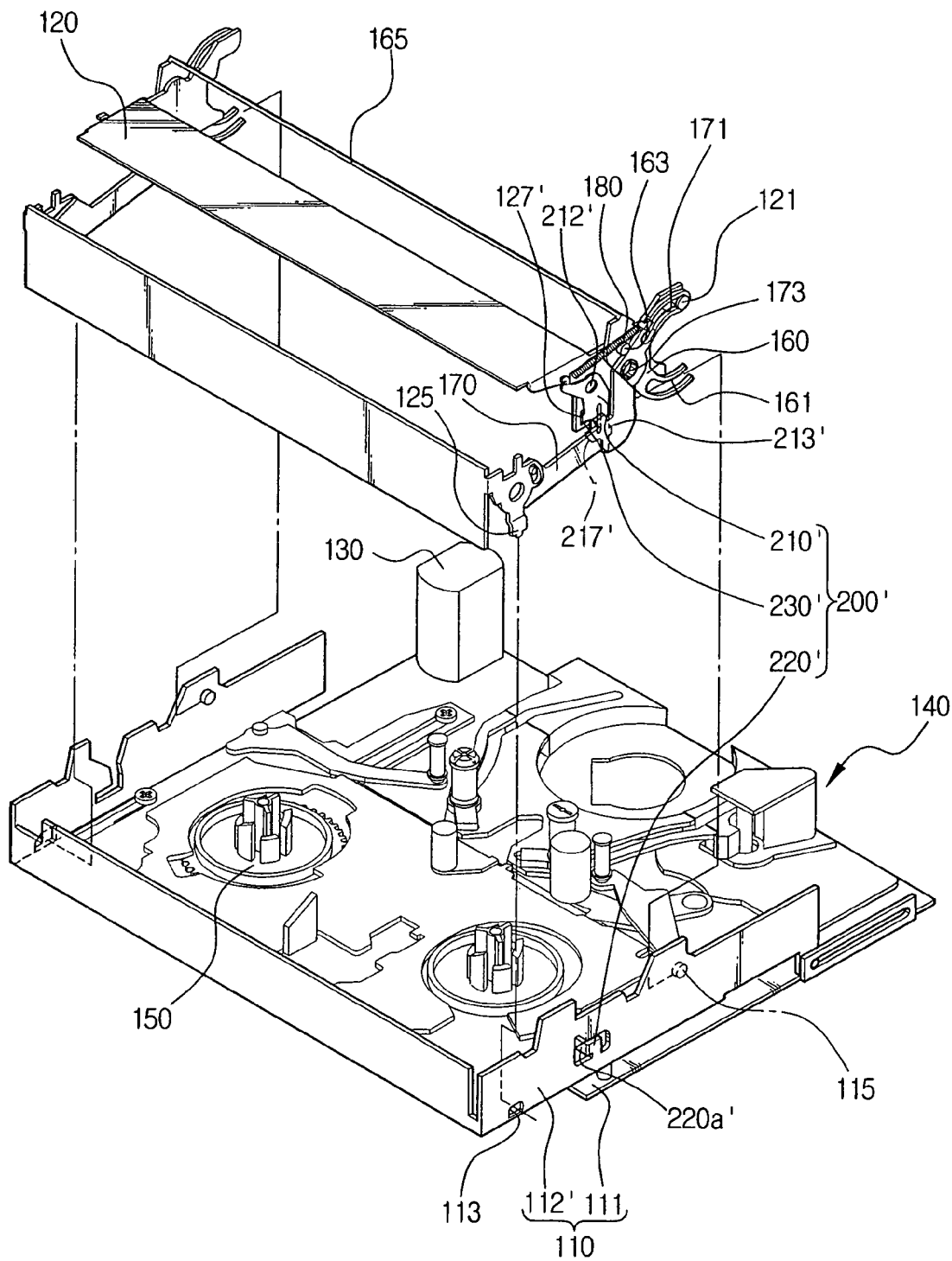
FIG. 8 is an exploded perspective view schematically showing a moving deck according to a second embodiment of the present invention.
Figure 9:
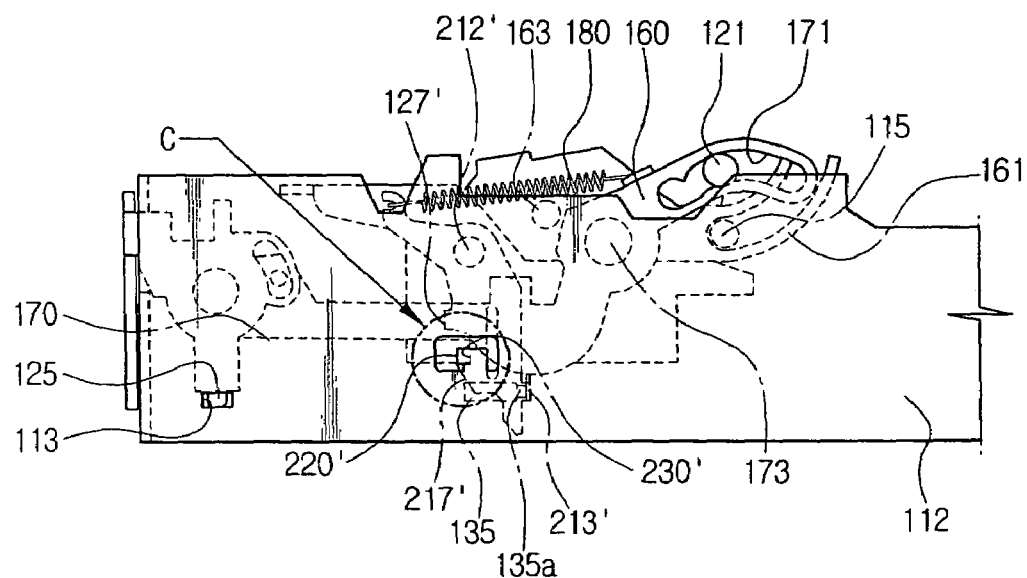
FIG. 9 is a side section view showing the tape cassette housing of FIG. 8 seated on the deck chassis.
Figure 10:
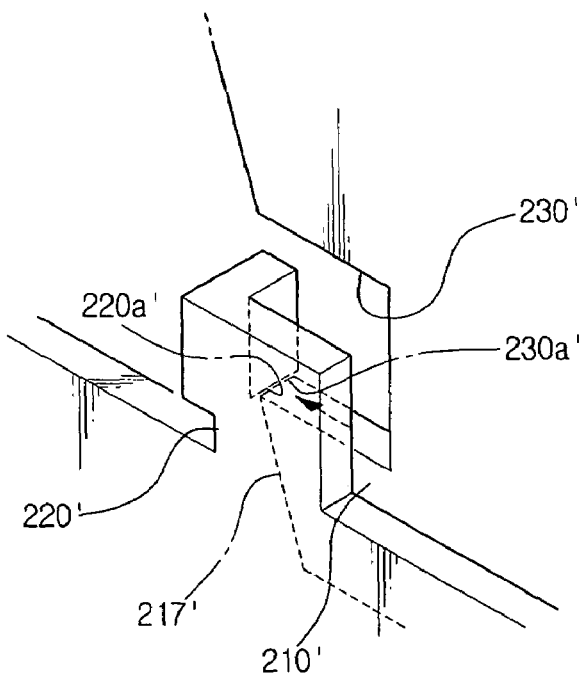
FIG. 10 is a perspective view magnifying part of C of FIG. 9.

FIGS. 8 to 10 are views showing a deck 100 for a tape recorder having a tape cassette housing locking device 200' according to another embodiment of the present invention. The tape cassette housing locking device 200' in this embodiment has the substantially same construction as that of the above-described embodiment, except that a locking protrusion 220' is modified in shape and there is no need for the installation of the unlocking lever 117 (described in reference to FIG. 5), because an unlocking protrusion 213' comes into contact directly with the unlocking switch 130 as the tape cassette housing 120 is locked.

The locking protrusion 220' differs from the locking protrusion 220 of the above-described embodiment in that a side end of the locking protrusion 220' is bent inward at or about 90° toward the deck 100 to be inserted into a locking recess 230'.

As described above, modifying the bending portion and bending direction of the locking protrusion 220', prevents errors in combining the locking protrusion 220' and the locking recess 230'. These errors are caused by the deformation of the upper portion of the locking protrusion 210 that occurs by the frequent contact of the locking recess 230 and the locking protrusion 210.

The elements and operations of the deck 100 are identical to that of the above-described embodiment, and descriptions thereof will be omitted.

Also, although the descriptions of the various embodiments of the invention have been limited to the camcorder employing the moving deck 100, the various embodiments of the present invention can be applied to any type tape recorder. This includes, for example, a video tape recorder (VTR), if it employs the tape cassette housing 120 resiliently contacting to, and separating from, the deck chassis 110. even in the absence of the moving deck 100.

According to the various embodiments of the present invention as described above, the stopping of the ascending and descending movements of the tape cassette housing 120 due to the interference between the locking recess 230 and the locking protrusion 220 is prevented during loading/unloading operations of the tape cassette.

The foregoing embodiments and advantages are merely exemplary and are not to be construed as limiting the present invention. The present teaching can be readily applied to other types of apparatuses. The description of the various embodiments of the present invention is intended to be illustrative, and not meant to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A deck of a tape recorder comprising:
a deck chassis; a tape cassette housing; and
a locking device for the tape cassette housing of the tape recorder, which comprises:
a locking lever connected to the tape cassette housing when the tape cassette housing is both received in and removed from the deck chassis;
a locking recess formed within the locking lever; and
a locking protrusion, comprising at least one edge formed at an outer surface such that the at least one edge comes into contact with a corner of the locking recess when the tape cassette housing is locked onto the deck chassis, and at least one edge of the locking protrusion being integrally formed as one piece with the deck chassis.

2. The deck of a tape recorder according to claim 1, wherein the at least one edge of the locking protrusion further comprises:
a top end of the locking protrusion bent at or about 90° toward the interior of the deck chassis.

3. The deck of a tape recorder according to claim 1, wherein the at least one edge of the locking protrusion further comprises:
a side end of the locking protrusion bent at or about 90° toward the interior of the deck chassis.

4. The deck of a tape recorder according to claim 1, wherein the locking recess comprises:
the corner being adapted to contact the at least one edge of the locking protrusion to mate the locking recess with the locking protrusion thereby locking the tape cassette housing.

5. The deck of a tape recorder according to claim 1, wherein:
the locking lever comprises an unlocking protrusion; and
the deck chassis comprises an unlocking switch and an unlocking lever, the combination of the unlocking protrusion, unlocking switch and unlocking lever are adapted to release the tape cassette housing after it is locked by sliding the unlocking switch to move the unlocking lever, which contacts the unlocking protrusion which contacts and causes the locking lever to rotate and unlock from a locked condition by releasing the locking protrusion from the locking recess.

6. The deck of a tape recorder according to claim 1, wherein:
the locking lever further is adapted to pivot within a range determined by a regulating protrusion and a second hinge, and hinged to a side of the tape cassette housing by a first hinge, and connected to a first link member by a resilient member, the resilient member adapted to allow the tape cassette housing to resiliently ascend and descend within the deck chassis.

7. A locking device of a tape cassette housing of a tape recorder, comprising:

a locking recess formed within a locking lever, the locking lever being directly connected to the tape cassette housing when the tape cassette housing is both received in and removed from the tape recorder; and a locking protrusion, comprising at least one edge formed at an outer surface such that the at least one edge comes into contact with a corner of the locking recess when the tape cassette housing is locked onto a deck chassis, and at least one edge of the locking protrusion being integrally formed as one piece with the deck chassis.

8. The locking device according to claim 7, wherein the locking recess comprises:

the corner being adapted to contact the at least one edge to mate the locking recess with the locking protrusion thereby locking the tape cassette housing.

9. The locking device according to claim 7 further comprising:

an unlocking protrusion; and wherein the deck chassis comprises an unlocking switch and an unlocking lever, the combination of the unlocking protrusion, unlocking switch and unlocking lever are adapted to release the tape cassette housing after it is locked by sliding the unlocking switch to move the unlocking lever, which contacts the unlocking protrusion which contacts and causes the locking lever to rotate and unlock from a locked condition by releasing the locking protrusion from the locking recess.

10. The locking device according to claim 7 adapted to pivot within a range determined by a regulating protrusion and a second hinge, and hinged to a side of the tape cassette housing by a first hinge, and connected to a first link member by a resilient member, the resilient member adapted to allow the tape cassette housing to resiliently ascend and descend within the deck chassis.

11. A locking device for a tape cassette housing of a tape recorder comprising:

a locking lever connected to the tape cassette housing when the tape cassette housing is both received in and removed from the deck chassis;

a locking recess formed within the locking lever; and a locking protrusion, comprising at least one edge formed at an outer surface such that the at least one edge comes into contact with a corner of the locking recess when the tape cassette housing is locked onto a deck chassis, and at least one edge of the locking protrusion being integrally formed as one piece with the deck chassis.

12. The locking device according to claim 11, wherein the at least one edge of the locking protrusion further comprises:

a top end of the locking protrusion bent at or about 90° toward the interior of the deck chassis.

13. The locking device according to claim 11, wherein the at least one edge of the locking protrusion further comprises:

a side end of the locking protrusion bent at or about 90° toward the interior of the deck chassis.

14. The locking device according to claim 11, wherein the locking recess comprises:

the corner being adapted to contact the at least one edge of the locking protrusion to mate the locking recess with the locking protrusion thereby locking the tape cassette housing.

15. The locking device according to claim 11, wherein:

the locking lever comprises an unlocking protrusion; and the deck chassis comprises an unlocking switch and an unlocking lever, the combination of the unlocking protrusion, unlocking switch and unlocking lever are adapted to release the tape cassette housing after it is locked by sliding the unlocking switch to move the unlocking lever, which contacts the unlocking protrusion which contacts and causes the locking lever to rotate and unlock from a locked condition by releasing the locking protrusion from the locking recess.

16. The locking device according to claim 11 wherein:

the locking lever is adapted to pivot within a range determined by a regulating protrusion and a second hinge, and hinged to a side of the tape cassette housing by a first hinge, and connected to a first link member by a resilient member, the resilient member adapted to allow the tape cassette housing to resiliently ascend and descend within the deck chassis.

* * * * *